United States Patent
Zhao (10) Patent No.: US 10,425,388 B2
(45) Date of Patent: Sep. 24, 2019

(54) PROTECTING SENSITIVE DATA SECURITY

(71) Applicant: Alibaba Group Holding Limited, Grand Cayman (KY)

(72) Inventor: Jie Zhao, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 100 days.

(21) Appl. No.: 15/016,171

(22) Filed: Feb. 4, 2016

(65) Prior Publication Data
US 2016/0234175 A1    Aug. 11, 2016

(30) Foreign Application Priority Data
Feb. 5, 2015    (CN) .......................... 2015 1 0061344

(51) Int. Cl.
*H04L 29/06* (2006.01)
*H04L 29/08* (2006.01)

(52) U.S. Cl.
CPC ........ *H04L 63/0428* (2013.01); *H04L 63/045* (2013.01); *H04L 63/0435* (2013.01); *H04L 63/067* (2013.01); *H04L 67/1097* (2013.01)

(58) Field of Classification Search
CPC ... H04L 63/0428; H04L 63/06; H04L 9/0825; H04L 9/16; H04L 9/3297; H04L 63/067;
(Continued)

(56) References Cited

U.S. PATENT DOCUMENTS

| 5,745,572 A | 4/1998 | Press |
| 6,370,251 B1 | 4/2002 | Hardy et al. |

(Continued)

FOREIGN PATENT DOCUMENTS

| CN | 101159540 A | 4/2008 |
| CN | 101184107 A | 5/2008 |

(Continued)

OTHER PUBLICATIONS

PCT Search Report and Written Opinion dated Sep. 23, 2016 for PCT Application No. PCT/US16/16656, 11 pages.
(Continued)

*Primary Examiner* — Yogesh Paliwal
*Assistant Examiner* — Chi D Nguy
(74) *Attorney, Agent, or Firm* — Lee & Hayes, P.C.

(57) ABSTRACT

A method for protecting encrypted data may includes encrypting, by a client terminal, the sensitive data by using a key in response to receipt of the sensitive data; sending the encrypted sensitive data to a provider server through a first request and obtaining a unique tag corresponding to the sensitive data; and sending the key and the unique tag to the provider server through a second request so that the provider server decrypts the sensitive data corresponding to the unique tag by using the key. The first request and the second request are different requests. Since the client terminal sends the encrypted sensitive data and the key to the provider server respectively in different requests, if others intercept the encrypted sensitive data, it is difficult to intercept the key carried in another request, and the encrypted sensitive data cannot be decrypted. Thus security of the sensitive data is protected.

14 Claims, 9 Drawing Sheets

(58) Field of Classification Search
CPC ............... H04L 63/045; H04L 63/0435; H04L 67/1097; G06F 21/6218; G06F 21/602; G06Q 20/382; G06Q 20/3823; G06Q 30/08; G06Q 30/00; G06Q 30/0613
See application file for complete search history.

(56) References Cited

U.S. PATENT DOCUMENTS

| | | | |
|---|---|---|---|
| 7,907,732 | B2 | 3/2011 | Yarvis |
| 8,594,335 | B1 | 11/2013 | Izhar et al. |
| 2004/0054963 | A1* | 3/2004 | Kobayashi ......... H04N 1/00132 715/255 |
| 2007/0157031 | A1* | 7/2007 | Sudhakar ............... H04L 9/083 713/189 |
| 2007/0244877 | A1* | 10/2007 | Kempka ........... G06F 17/30067 |
| 2007/0286416 | A1 | 12/2007 | Bertoni et al. |
| 2008/0310619 | A1 | 12/2008 | Scheidt et al. |
| 2009/0097662 | A1 | 4/2009 | Olechowski et al. |
| 2011/0040686 | A1 | 2/2011 | Carlson |
| 2011/0055563 | A1 | 3/2011 | Chandran et al. |
| 2013/0125247 | A1 | 5/2013 | Sprague et al. |
| 2013/0346310 | A1* | 12/2013 | Burger .................... G06F 21/00 705/44 |
| 2014/0089049 | A1 | 3/2014 | Cristofaro |
| 2014/0143548 | A1* | 5/2014 | Wang .................... H04L 9/0897 713/171 |
| 2014/0281493 | A1 | 9/2014 | Nakhjiri |
| 2015/0089233 | A1* | 3/2015 | Roth ..................... H04L 9/3247 713/176 |
| 2016/0044625 | A1* | 2/2016 | Anesi ..................... H04W 64/00 455/411 |
| 2016/0127326 | A1* | 5/2016 | Lin ..................... H04L 63/0428 713/171 |

FOREIGN PATENT DOCUMENTS

| | | |
|---|---|---|
| CN | 101204036 A | 6/2008 |
| CN | 101242264 A | 8/2008 |
| CN | 103686717 A | 3/2014 |
| CN | 104065623 A | 9/2014 |
| JP | 2004094677 A | 3/2004 |
| JP | 2005242645 A | 9/2005 |
| JP | 2009528599 A | 8/2009 |
| JP | 2010515165 A | 5/2010 |
| WO | WO0146773 A2 | 6/2001 |

OTHER PUBLICATIONS

Extended European Search Report dated Oct. 30, 2018 for European Patent Application No. 16749620.7, 9 pages.
Machine translation of the first Chinese Office Action dated Jul. 26, 2018 for Chinese patent application No. 201510061344.8, a foreign counterpart application of U.S. Appl. No. 15/016,171, 28 pages.
Chinese search report for Chinese patent application No. 201510061344.8 dated Jul. 18, 2018, 2 pages.
PCT Invitation to Pay Additional Fees dated Jul. 12, 2016 for PCT Application No. PCT/US16/16656, 2 pages.
Japanese Office Action dated Apr. 2, 2019 for Japanese Patent Application No. 2017-536865, a of U.S. Appl. No. 15/016,171, 17 pages.
Tara Yoshio, "Digital Copyrights: Protect Music Copyrights with Small Memory Cards," Nikkei Electronics, No. 739, Nikkei Business Publications, Inc., Mar. 22, 1999, Japan, pp. 49-53.

* cited by examiner

PROTECTING SENSITIVE DATA SECURITY

CROSS REFERENCE TO RELATED PATENT APPLICATION

This application claims foreign priority to Chinese Patent Application No. 201510061344.8 filed on 5 Feb. 2015, entitled "Method, Apparatus and Three-party Service System for Protecting Sensitive Data Security", which is hereby incorporated by reference in its entirety.

TECHNICAL FIELD

The present disclosure relates to the field of security, and, more particularly, to a method and apparatus and a three-party service system for protecting the security of sensitive data.

BACKGROUND

With the constant improvement of the economy and gradual subdivision of industries, third party service continues to rapidly developing. The third party service is realized by a provider server, a client terminal and a third party server through cooperating with each other. The third party service encapsulates a service provided by a service provider and a service extended by a third party itself, and provides data input and display for users through the client terminal, which provides better service experience for the users.

Since the third party service encapsulates the service provided by the service provider and the service extended by the third party itself, after the client terminal receives data input by a user, the client terminal or the third party server will generate, with respect to the input, some three-party service data that needs to be sent by the third party server to the provider server. For example, the three-party service data may be a three-party identification for reconciling a service used by the user. Since the provider server needs to perform related processing on the data input by the user and the three-party service data, at present, the data input by the user and the three-party service data are submitted to the provider server mainly in the following manners. The client terminal encrypts the data input by the user by using a key. The client terminal submits the key, the encrypted input data and the three-party service data to the third party server through the same request. The third party server sends the key, the encrypted input data and the three-party service data submitted by the client terminal to the provider server through the same request. The provider server obtains the input data through decryption by using the key, and performs related processing on the input data and the three-party service data received through the same request.

However, the encrypted input data and the key are sent through the same request and pass through the third party server, which causes sensitive data in the input data to be easily leaked at the third party server.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "technique(s) or technical solution(s)" for instance, may refer to apparatus(s), system(s), method(s) and/or computer-readable instructions as permitted by the context above and throughout the present disclosure.

The present disclosure provides a method and apparatus for protecting security of sensitive data and a three-party service system to achieve the aim of protecting security of sensitive data.

In a first aspect of example embodiments of the present disclosure, a method for protecting security of sensitive data that is applied to a client terminal is provided. For example, the method may include: encrypting the sensitive data by using a key in response to receipt of the sensitive data, sending the encrypted sensitive data to a provider server through a first request, and obtaining a unique tag corresponding to the sensitive data, and sending the key and the unique tag to the provider server through a second request, in order that the provider server decrypts the sensitive data corresponding to the unique tag by using the key. The first request and the second request are different requests.

In a second aspect of the example embodiments of the present disclosure, an apparatus for protecting security of sensitive data that is configured at a client terminal is provided. For example, the apparatus may include: an encryption unit that encrypts the sensitive data by using a key in response to receipt of the sensitive data; a first request sending unit that sends the encrypted sensitive data to a provider server through a first request, and obtains a unique tag corresponding to the sensitive data; and a second request sending unit that sends the key and the unique tag to the provider server through a second request, in order that the provider server decrypts the sensitive data corresponding to the unique tag by using the key. The first request and the second request are different requests.

In a third aspect of the example embodiments of the present disclosure, a method for protecting security of sensitive data that is applied to a provider server is provided. For example, the method may include: acquiring encrypted sensitive data sent by a client terminal through a first request, wherein the encrypted sensitive data is specifically obtained by the client terminal through encryption by using a key in response to receipt of the sensitive data, acquiring a unique tag and the key sent by the client terminal through a second request. The unique tag is a unique tag of the sensitive data, and the first request and the second request are different requests; and decrypting the sensitive data corresponding to the unique tag by using the key.

In a fourth aspect of the example embodiments of the present disclosure, an apparatus for protecting security of sensitive data that is configured at a provider server is provided. For example, the apparatus may include: a sensitive data acquisition unit that acquires encrypted sensitive data sent by a client terminal through a first request, wherein the encrypted sensitive data is specifically obtained by the client terminal through encryption by using a key in response to receipt of the sensitive data; a key acquisition unit that acquires a unique tag and the key sent by the client terminal through a second request. The unique tag is a unique tag of the sensitive data, and the first request and the second request are different requests; and a decryption unit that decrypts the sensitive data corresponding to the unique tag by using the key.

In a fifth aspect of the embodiments of the present disclosure, a method for protecting security of sensitive data that is applied to a third party server is provided. For example, the method may include: acquiring a unique tag corresponding to sensitive data received by a client terminal; and sending a three-party service request that carries the unique tag of the sensitive data and three-party service data to a provider server, in order that the provider server performs related processing on the three-party service data and the sensitive data corresponding to the unique tag. The sensitive data is encrypted by the client terminal by using a key and then sent to the provider server through a first request; the key and the unique tag are sent to the provider server by the client terminal through a second request, in order that the provider server decrypts the sensitive data corresponding to the unique tag by using the key. The first request and the second request are different requests.

In a sixth aspect of the example embodiments of the present disclosure, an apparatus for protecting security of sensitive data that is configured at a third party server is provided. For example, the apparatus may include: a unique tag acquisition unit that acquires a unique tag corresponding to sensitive data received by a client terminal; and a three-party data sending unit that sends a three-party service request that carries the unique tag of the sensitive data and three-party service data to a provider server, in order that the provider server performs related processing on the three-party service data and the sensitive data corresponding to the unique tag. The sensitive data is encrypted by the client terminal by using a key and then sent to the provider server through a first request; the key and the unique tag are specifically sent to the provider server by the client terminal through a second request, in order that the provider server decrypts the sensitive data corresponding to the unique tag by using the key. The first request and the second request are different requests.

In a seventh aspect of the example embodiments of the present disclosure, a three-party service system is provided. For example, the system may include: a client terminal that encrypts sensitive data by using a key in response to receipt of the sensitive data, sends the encrypted sensitive data to a provider server through a first request, obtains a unique tag corresponding to the sensitive data, and sends the key and the unique tag to the provider server through a second request, wherein the first request and the second request are different requests; a third party server that acquires a unique tag corresponding to the sensitive data received by the client terminal, and sends a three-party service request that carries the unique tag of the sensitive data and three-party service data to the provider server; and the provider server that acquires the encrypted sensitive data sent by the client terminal through the first request, acquires the unique tag and the key sent by the client terminal through the second request, decrypts the sensitive data corresponding to the unique tag by using the key, acquires the three-party service data and the unique tag from the three-party service request, and performs related processing on the three-party service data and the sensitive data corresponding to the unique tag.

Thus, the techniques of the present disclosure have the following beneficial effects:

In the example embodiments of the present disclosure, the client terminal acquires a unique tag corresponding to the sensitive data; therefore, when sending a key, the client terminal may send the key and the unique tag in the same request, to make the unique tag identify the key and enable the provider server to read the corresponding sensitive data according to the unique tag sent together with the key and decrypt the sensitive data. It is not necessary to send the key and the sensitive data in the same request. Thus, the client terminal in the example embodiments of the present disclosure may send the encrypted sensitive data and the key to the provider server respectively in different requests. Even if others intercept the encrypted sensitive data, it is difficult to intercept the key carried in another request, and the encrypted sensitive data cannot be decrypted, so that security of the sensitive data can be protected.

In addition, the sensitive data has a corresponding unique tag, therefore, when it is necessary for the third party server to send three-party service data to the provider server, the three-party service data does not need to be sent together with the sensitive data. To send the unique tag together with the three-party service data makes the provider server perform related processing on the sensitive data and the three-party service data according to the unique tag. Therefore, the sensitive data does not need to pass through the third party server, which avoids leakage of the sensitive data at the third party server.

BRIEF DESCRIPTION OF THE DRAWINGS

In order to explain technical solutions of the example embodiments of the present disclosure clearly, a brief introduction of drawings to be used for describing the example embodiments is provided below. Apparently, the drawings described below are only some example embodiments of the present disclosure, and other drawings may be obtained according to these drawings by those skilled in the art without creative efforts.

DETAILED DESCRIPTION

To make the technical solutions of the present disclosure more comprehensible to those skilled in the art, the technical solutions in the example embodiments of the present disclosure are described as follows with reference to the accompanying drawings in the example embodiments of the present disclosure. Apparently, the example embodiments to be described are only a part and not all of the embodiments of the present disclosure. All other embodiments obtained by persons of ordinary skill in the art based on the example embodiments of the present disclosure without creative efforts shall belong to the protection scope of the present disclosure.

Figure 1:
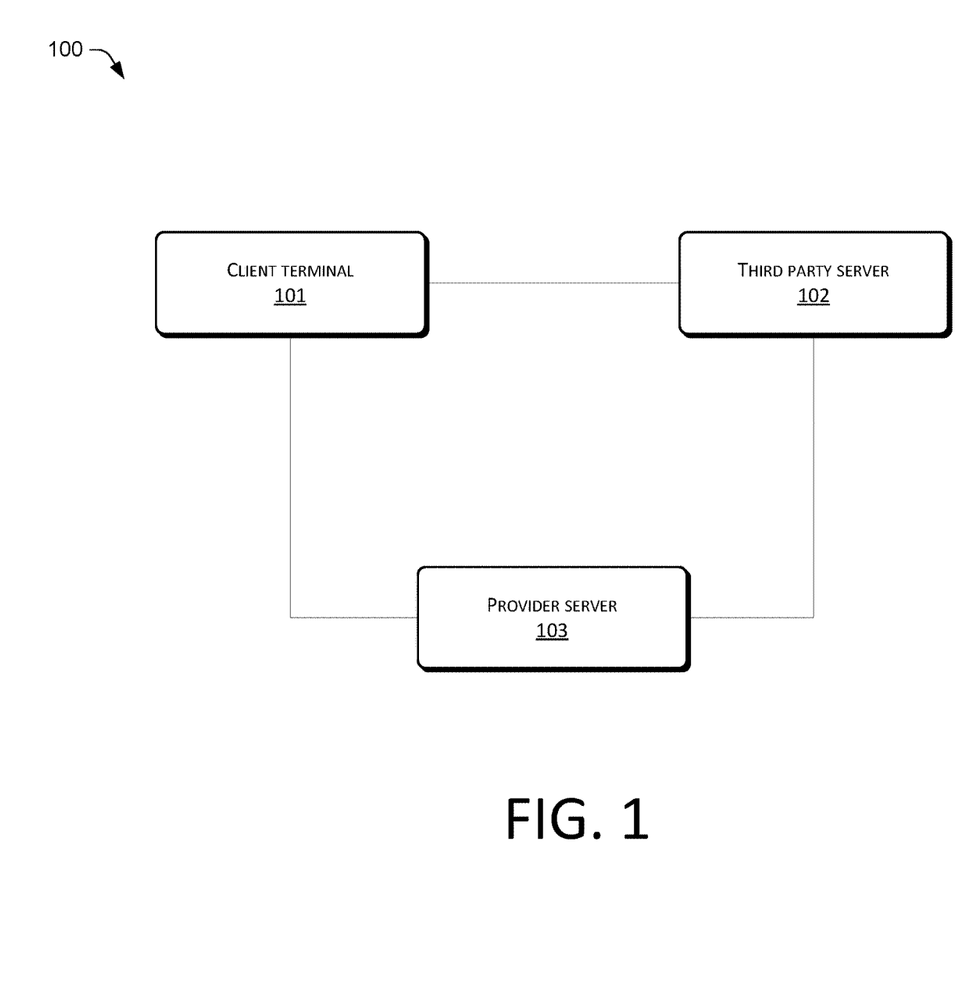
FIG. 1 is a schematic structural diagram of an example three-party service system according to an example embodiment of the present disclosure.

An example embodiment of the present disclosure provides an example three-party service system. For example, referring to FIG. 1, it is a schematic structural diagram of an example three-party service system 100 according to an example embodiment of the present disclosure. As shown in FIG. 1, the system 100 may include:

a client terminal 101 that encrypting sensitive data by using a key in response to receipt of the sensitive data, sends the encrypted sensitive data to a provider server through a first request, obtains a unique tag corresponding to the sensitive data, and sends the key and the unique tag to the provider server through a second request, wherein the first request and the second request are different requests;

a third party server 102 that acquires a unique tag corresponding to the sensitive data received by the client terminal, and sending a three-party service request that carries the unique tag of the sensitive data and three-party service data to the provider server; and a provider server 103 that acquires the encrypted sensitive data sent by the client terminal through the first request, acquires the unique tag and the key sent by the client terminal through the second request, decrypts the sensitive data corresponding to the unique tag by using the key, acquires the three-party service data and the unique tag from the three-party service request, and performs related processing on the three-party service data and the sensitive data corresponding to the unique tag.

In the three-party service system 100 according to the embodiment of the present disclosure, the client terminal 101 obtains a unique tag corresponding to the sensitive data; therefore, when sending the key, the client terminal 101 may send the key and the unique tag in the same request, to make the unique tag identify the key and enable the provider server 103 to read the corresponding sensitive data according to the unique tag sent together with the key and decrypt the sensitive data. It is not necessary to require the client terminal 101 to send the key and the sensitive data in the same request; thus, the client terminal 101 in the example embodiment of the present disclosure may send the encrypted sensitive data and the key to the provider server 103 respectively in different requests. Even if others intercept the encrypted sensitive data, it is difficult to intercept the key carried in another request, and the encrypted sensitive data cannot be decrypted, so that security of the sensitive data can be protected. In addition, the sensitive data has a corresponding unique tag, therefore, the three-party service data sent by the third party server 102 may be sent together with the unique tag, so that the unique tag may be used for identifying the three-party service data. The provider server 103, according to the unique tag, reads the corresponding sensitive data, and performs related processing on the sensitive data and the three-party service data, which avoids leakage of the sensitive data at the third party server.

For example, in an example implementation of a securities exchange service, the three-party service system 100 may include:

the client terminal 101, such as a securities exchange client terminal that provides input and display of securities exchange data for users;

the third party server 102, such as a securities exchange server that cooperates with the client terminal 101 and a provider server 103 to provide securities quotation consultation, query, account opening and other services; and the provider server 103, such as a server of one or more different securities providers that provide the final securities service.

Some sensitive data may exist in the user input data received by the client terminal 101, such as securities exchange data. The sensitive data are generally only allowed visible to the provider server 103, but are not allowed visible to the third party server 102. In order to prevent the sensitive data from leaking at the third party server 102 and protect security of the sensitive data, the present disclosure provides the following method, apparatus and system of protecting security of sensitive data.

It should be noted that the three-party service system mentioned above is only an example system architecture of the example embodiment of the present disclosure. The example embodiment of the present disclosure is suitable for, but is not limited to, a three-party service system. For example, the example embodiment of the present disclosure may also be applied to a two-party service system that only includes a client terminal and a provider server.

Figure 2:
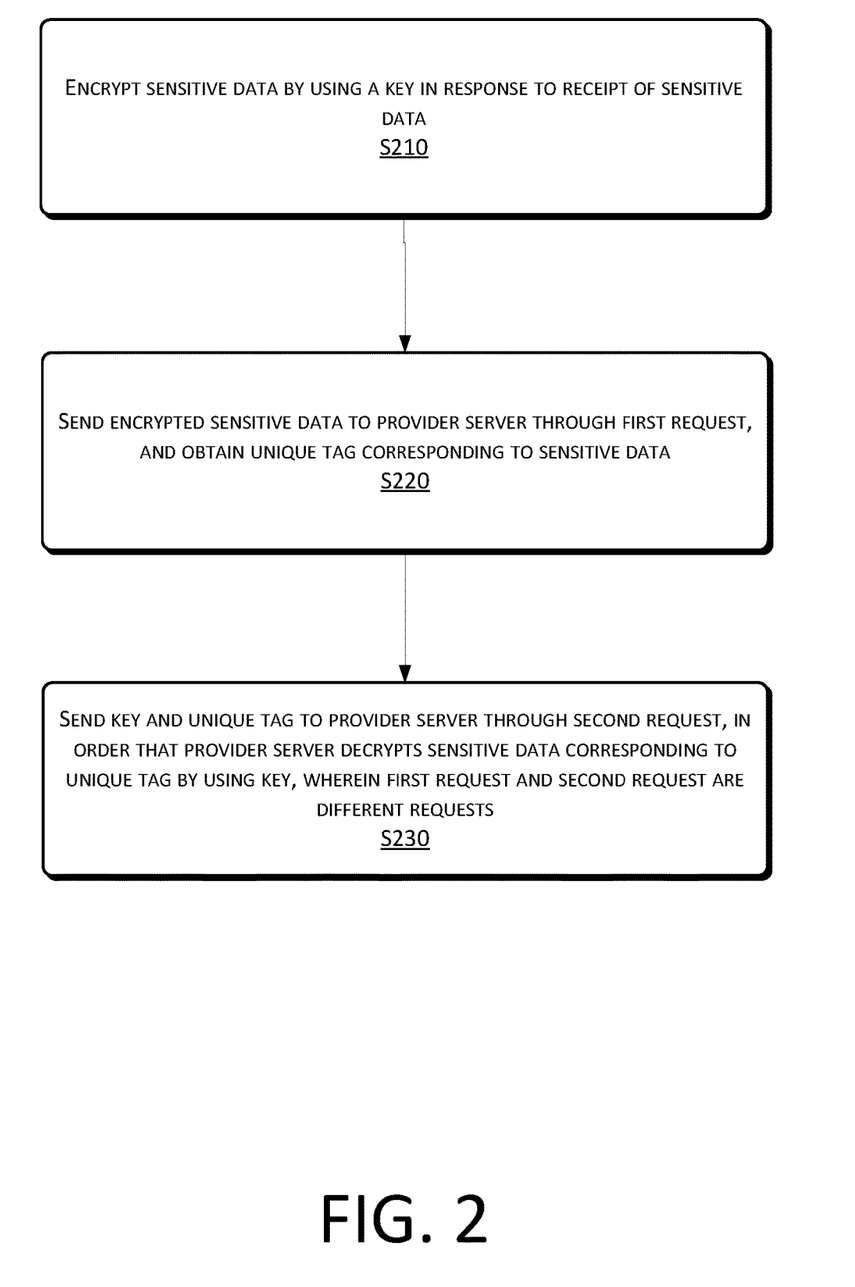
FIG. 2 is a flow chart of an example method for protecting security of sensitive data that is applied to a client terminal according to an example embodiment of the present disclosure.

In one aspect, an embodiment of the present disclosure provides a method for protecting the security of sensitive data that is applied to a client terminal. For example, referring to FIG. 2, FIG. 2 is a flow chart of an example method for protecting the security of sensitive data that is applied to a client terminal according to an embodiment of the present disclosure. As shown in FIG. 2, the method may include:

At S210, the sensitive data is encrypted by using a key in response to receipt of the sensitive data.

The key is used for encrypting and decrypting data, which may be a character string composed of characters, numbers and other characters, for example, 9iTein75ed03kd8551t-G3221. In some example implementations, the key is a dynamic key generated for the sensitive data. For example, each time the client terminal receives sensitive data, the client terminal generates a string of new symmetrically encrypted dynamic keys for the sensitive data.

For example, the client terminal may receive data input by a user, wherein all or a part of the data input by the user may be sensitive data. After sensitive data is acquired from the data input by the user, the key is used to encrypt the sensitive data. The encryption algorithm may be a symmetric encryption algorithm, for example, AES256 or 3EDS.

At S220, the encrypted sensitive data is sent to a provider server through a first request, and a unique tag corresponding to the sensitive data is obtained.

In order to protect the security of the sensitive data and prevent the sensitive data from leaking at a third party server, for example, the client terminal may directly send a first request that carries the encrypted sensitive data to the provider server, and the first request does not pass through the third party server during transmission. The provider server may obtain the encrypted sensitive data from the first request.

An implementation of obtaining a unique tag corresponding to the sensitive data is not limited. For example, the client terminal may receive a unique tag generated and returned by the provider server after receiving the encrypted sensitive data, wherein the unique tag includes a random code and a timestamp. The timestamp may be used for checking validity of the unique tag at the provider server. For another example, after receiving the sensitive data, the client terminal may generate the unique tag for the sensitive data. For another example, the client terminal may receive the unique tag generated and returned by a third party server for the sensitive data of the client terminal.

At S230, the key and the unique tag are sent to the provider server through a second request, in order that the provider server decrypts the sensitive data corresponding to the unique tag by using the key, wherein the first request and the second request are different requests.

In order to avoid leakage of a real key, the client terminal may use a public key to encrypt a private key and generate the encrypted key. For example, an asymmetric encryption algorithm such as RSA may be used. In the example embodiment of the present disclosure, the key sent by the client terminal to the third party server or the provider server may be the encrypted key. The private key corresponding to the public key may be possessed by the provider server, in order that the provider server, after receiving the encrypted key, uses the private key to decrypt the encrypted key, to obtain the decrypted key, and uses the decrypted key to decrypt the encrypted sensitive data, to obtain the decrypted sensitive data.

For example, the second request that carries the key and the unique tag is sent to the third party server in order that the third party server obtains the unique tag and the key from the second request, and sends a three-party service request that carries the unique tag and the key to the provider server.

In an example embodiments, the client terminal may further send three-party service data identified by the unique tag to the third party server in order that the third party server generates a three-party service request that carries the unique tag and the three-party service data, and sends the three-party service request to the provider server. Thus, the provider server performs related processing on the three-party service data and the sensitive data corresponding to the unique tag. For example, the three-party service data may include: a three-party identification for reconciling a service used by the user, related service data of securities quotation consultation, query, account opening or other services, and so on.

As, in the example embodiments of the present disclosure, the client terminal acquires a unique tag corresponding to the sensitive data, therefore, when sending a key, the client terminal may send the key and the unique tag in the same request, to make the unique tag identify the key and enable the provider server to read the corresponding sensitive data according to the unique tag sent together with the key and decrypt the sensitive data. Thus it is not necessary to send the key and the sensitive data in the same request. The client terminal in the example embodiments of the present disclosure may send the encrypted sensitive data and the key to the provider server respectively in different requests. Even if others intercept the encrypted sensitive data, it is difficult to intercept the key carried in another request, and thus the encrypted sensitive data cannot be decrypted, thereby protecting security of the sensitive data.

An example implementation of an example embodiment of the present disclosure is described in detail with reference to the schematic diagram of signaling interaction shown in FIG. 3.

Figure 3:
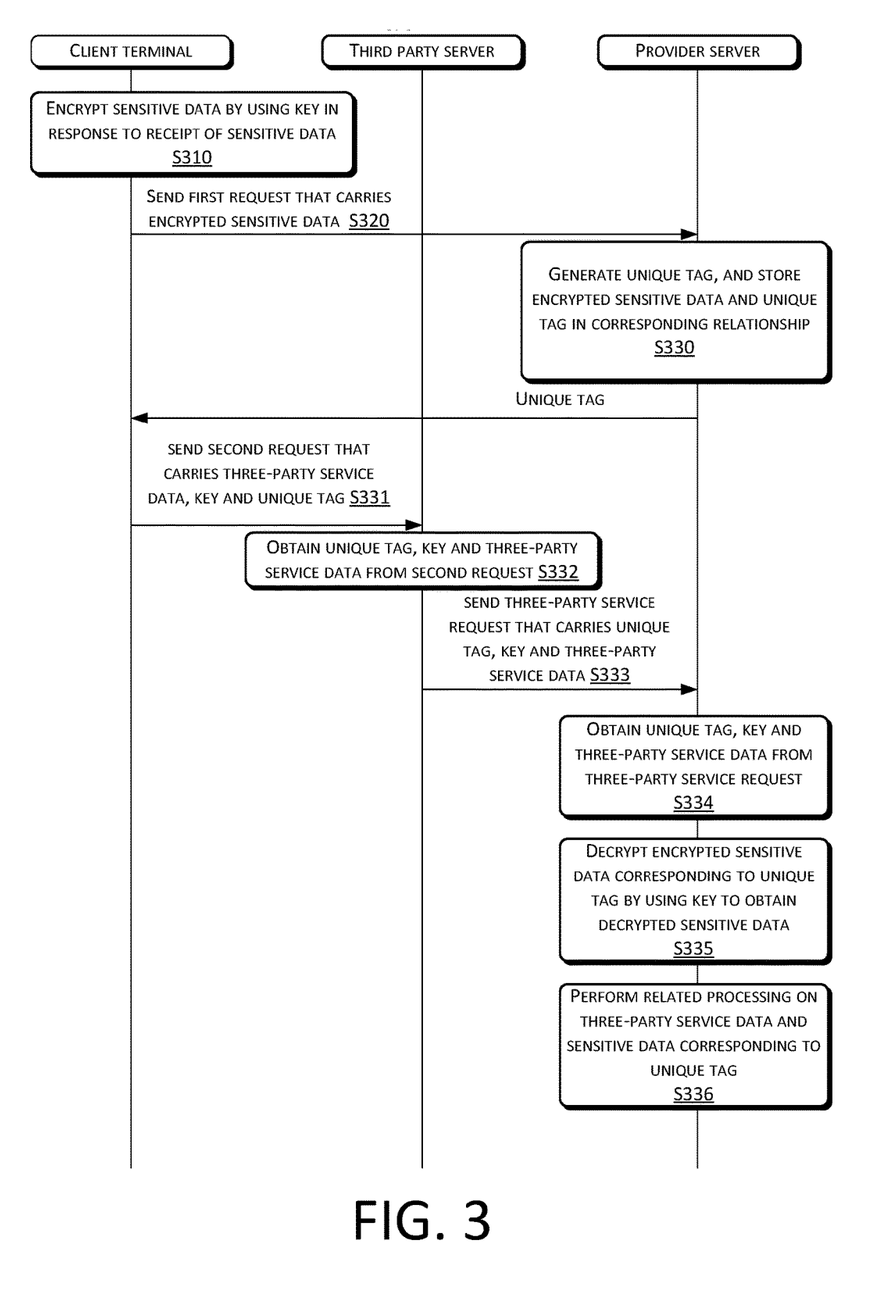
FIG. 3 is a schematic diagram of an example signaling interaction according to an example embodiment of the present disclosure.

For example, as shown in FIG. 3, the implementation may include:

At S310, a client terminal encrypts sensitive data by using a key in response to receipt of the sensitive data.

At S320, the client terminal sends a first request that carries the encrypted sensitive data to a provider server.

At S330, the provider server obtains the encrypted sensitive data from the first request, generates a unique tag, and stores the encrypted sensitive data and the unique tag in a corresponding relationship. For example, the encrypted sensitive data and the unique tag are used to form a key-value pair to be stored in a cache. The unique tag of the sensitive data may be generated by the provider server, and returned to the client terminal. For example, a unique tag including a random code and a timestamp is generated.

At S331, the client terminal sends a second request that carries the three-party service data, the key and the unique tag to the third party server.

At S332, the third party server obtains the unique tag, the key and the three-party service data from the second request. After obtaining the three-party service data, the third party server may further perform related processing on the three-party service data according to actual service needs. For example, the three-party service data and the unique tag are stored correspondingly in the third party server and the like.

At S333, the third party server sends the three-party service request that carries the unique tag, the key and the three-party service data to the provider server.

At S334, the provider server obtains the unique tag, the key and the three-party service data from the three-party service request.

At S335, the provider server decrypts the encrypted sensitive data corresponding to the unique tag by using the key, to obtain the decrypted sensitive data.

At S336, the provider server performs related processing on the three-party service data and the sensitive data corresponding to the unique tag.

In the example implementation, since the client terminal sends the key, the three-party service data and the unique tag together to the third party server by carrying them in a second request, the third party server then forwards them together to a provider server. Compared with the implementation of sending, by the client terminal, the key and the three-party service data respectively in different requests, the techniques of the present disclosure reduce the number of times the client terminal sends the request to some extent, reduce occupation of network resources, and increase working efficiency of the client terminal.

An example implementation of an example embodiment of the present disclosure is described in detail with reference to the schematic diagram of signaling interaction shown in FIG. 4.

Figure 4:
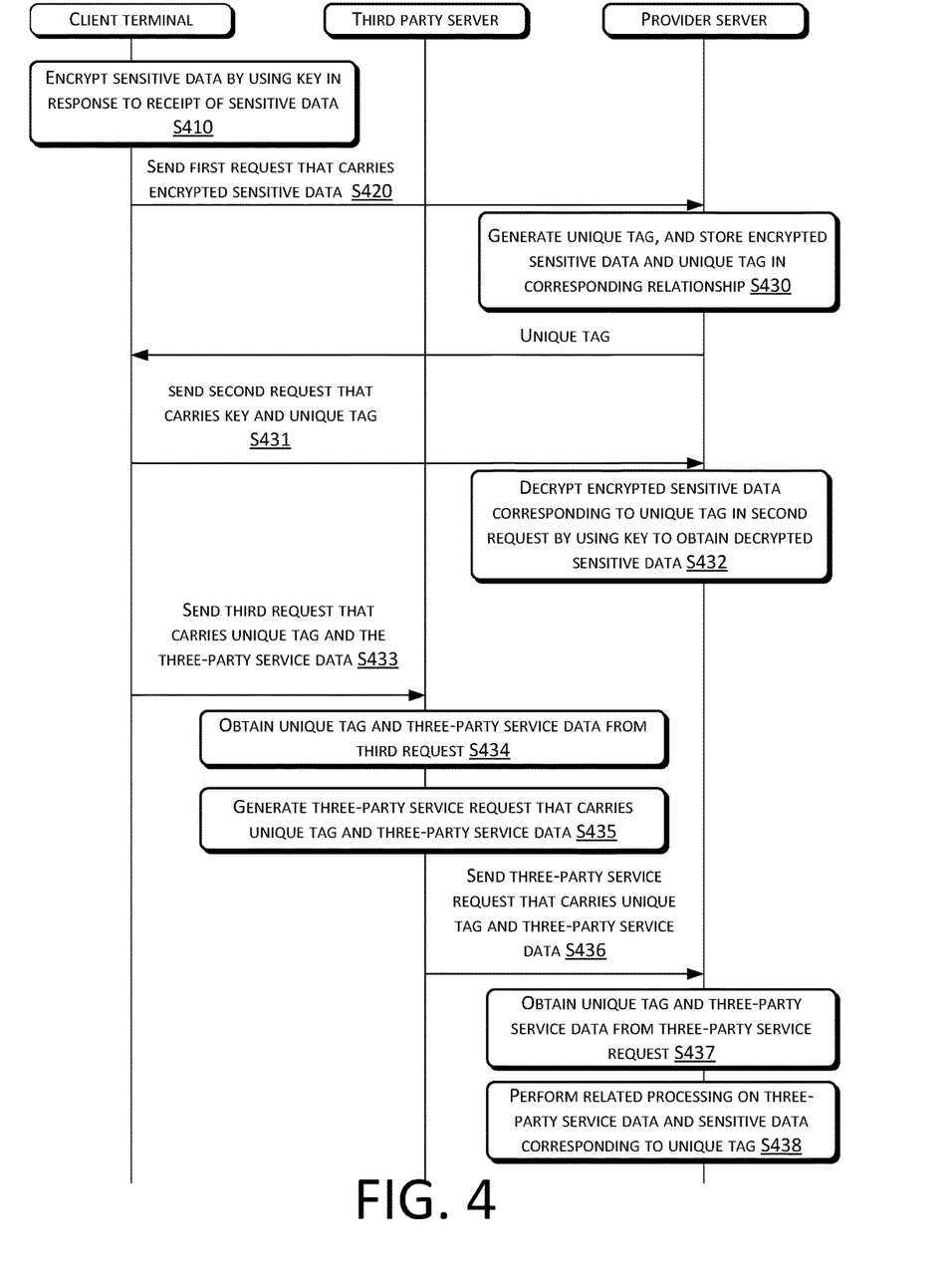
FIG. 4 is a schematic diagram of another example signaling interaction according to an example embodiment of the present disclosure.

For example, as shown in FIG. 4, the implementation may include:

At S410, a client terminal encrypts sensitive data by using a key in response to receipt of the sensitive data.

At S420, the client terminal sends a first request that carries the encrypted sensitive data to a provider server.

At S430, the provider server obtains the encrypted sensitive data from the first request, generates a unique tag, and stores the encrypted sensitive data and the unique tag in a corresponding relationship.

At S431, the client terminal sends a second request that carries the key and the unique tag to the provider server.

At S432, the provider server obtains the key from the second request, and decrypts the encrypted sensitive data corresponding to the unique tag in the second request by using the key, to obtain the decrypted sensitive data.

At S433, the client terminal sends a third request that carries the unique tag and the three-party service data to the third party server.

At S434, the third party server obtains the unique tag and the three-party service data from the third request.

At S435, the third party server generates a three-party service request that carries the unique tag and the three-party service data.

At S436, the third party server sends the three-party service request that carries the unique tag and the three-party service data to the provider server.

At S437, the provider server obtains the unique tag and the three-party service data from the three-party service request.

At S438, the provider server performs related processing on the three-party service data and the sensitive data corresponding to the unique tag.

In the example implementation, since the key will not be sent to the third party server, leakage of the key at the third party server is prevented, and security of the sensitive data is further protected.

Corresponding to the method for protecting sensitive data that is applied to a client terminal, an example embodiment of the present disclosure further provides an apparatus for protecting sensitive data that is configured at a client terminal.

Figure 5:
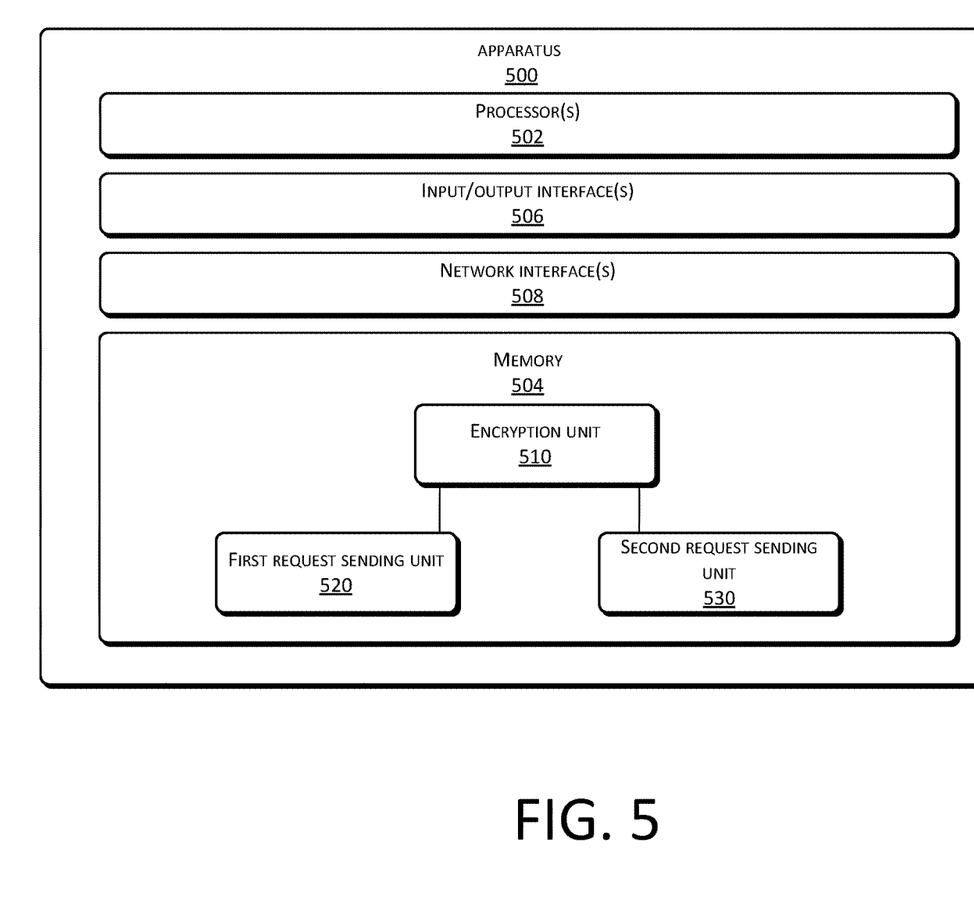
FIG. 5 is a schematic structural diagram of an example apparatus for protecting the security of sensitive data that is configured at a client terminal according to an example embodiment of the present disclosure.

For example, referring to FIG. 5, it is a schematic structural diagram of an example apparatus 500 for protecting sensitive data that is configured at a client terminal according to an example embodiment of the present disclosure. As shown in FIG. 5, the apparatus 500 may include one or more processor(s) 502 or data processing unit(s) and memory 504. The apparatus 500 may further include one or more input/output interface(s) 506, and network interface(s) 508. The memory 504 is an example of computer-readable media.

The computer-readable media includes permanent and non-permanent, movable and non-movable media that may use any methods or techniques to implement information storage. The information may be computer-readable instructions, data structure, software modules, or any data. The example of computer storage media may include, but is not limited to, phase-change memory (PCM), static random access memory (SRAM), dynamic random access memory (DRAM), other type RAM, ROM, electrically erasable programmable read only memory (EEPROM), flash memory, internal memory, CD-ROM, DVD, optical memory, magnetic tape, magnetic disk, any other magnetic storage device, or any other non-communication media that may store information accessible by the computing device. As defined herein, the computer-readable media does not include transitory media such as a modulated data signal and a carrier wave.

The memory 504 may store therein a plurality of modules or units including:
- an encryption unit 510 that encrypts the sensitive data by using a key in response to receipt of the sensitive data;
- a first request sending unit 520 that sends the encrypted sensitive data to a provider server through a first request, and obtains a unique tag corresponding to the sensitive data; and
- a second request sending unit 530 that sends the key and the unique tag to the provider server through a second request, in order that the provider server decrypts the sensitive data corresponding to the unique tag by using the key. The first request and the second request are different requests.

As the first sending unit 520 of the apparatus 500 acquires a unique tag corresponding to the sensitive data, when sending a key, the second request sending unit 530 may send the key and the unique tag in the same request, to make the unique tag identify the key and enable the provider server to read the corresponding sensitive data according to the unique tag sent together with the key and decrypt the sensitive data. Thus, it is not necessary to send the key and the sensitive data in the same request; and the client terminal in the example embodiment of the present disclosure may send the encrypted sensitive data and the key to the provider server respectively in different requests. Even if others intercept the encrypted sensitive data, it is difficult to intercept the key carried in another request, and the encrypted sensitive data cannot be decrypted, so that security of the sensitive data is protected.

Figure 6:
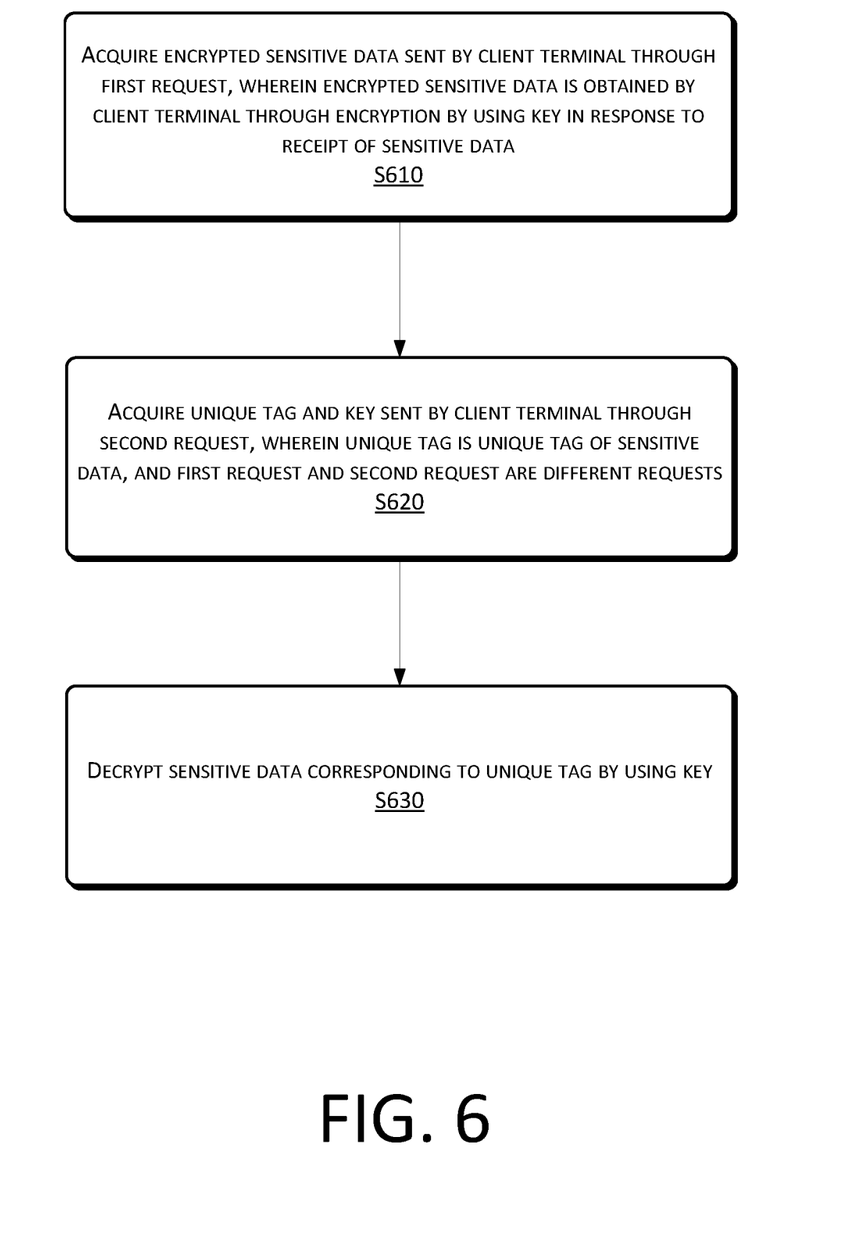
FIG. 6 is a schematic flow chart of an example method for protecting the security of sensitive data that is applied to a provider server according to an example embodiment of the present disclosure.

In another aspect, an example embodiment of the present disclosure further provides an example method for protecting security of sensitive data that is applied to a provider server. For example, referring to FIG. 6, it is a schematic flow chart of an example method for protecting security of sensitive data that is applied to a provider server according to an example embodiment of the present disclosure. As shown in FIG. 6, the method may include:

At S610, encrypted sensitive data sent by a client terminal through a first request is acquired. For example, the encrypted sensitive data is obtained by the client terminal through encryption by using a key in response to receipt of the sensitive data.

At S620, a unique tag and a key sent by the client terminal through a second request are acquired. The unique tag is a unique tag of the sensitive data, and the first request and the second request are different requests.

For example, the provider server may, after receiving the encrypted sensitive data from the client terminal, generate a unique tag of the sensitive data, and return the unique tag to the client terminal, wherein the unique tag may include a random code and a timestamp. For another example, the provider server may, upon receipt of the encrypted sensitive data from the client terminal, receive the unique tag that is sent together with the encrypted sensitive data, wherein the unique tag is generated for the sensitive data by the client terminal after receiving the sensitive data. For another example, the provider server may, upon receipt of the encrypted sensitive data from the client terminal, receive the unique tag that is sent together with the encrypted sensitive data, wherein the unique tag is generated by the third party server for sensitive data of the client terminal.

For example, in some example implementations, with reference to the schematic diagram of signaling interaction shown in FIG. 4, the provider server may receive a second request carrying the unique tag and the key that is sent from the client terminal, to acquire the unique tag and the key from the second request.

At S630, the sensitive data corresponding to the unique tag is decrypted by using the key.

In example implementations, the provider server may receive a three-party service request sent from a third party server, wherein the three-party service request carries the unique tag and three-party service data, and performs related processing on the three-party service data and the sensitive data corresponding to the unique tag.

In example implementations, the three-party service request further carries the key. For example, with reference to the schematic diagram of signaling interaction shown in FIG. 3, in the implementation, the provider server may acquire the unique tag, the key and the three-party service data from the received three-party service request. The three-party service request may be sent by the third party server correspondingly in response to receipt of a second request carrying the unique tag, the key and the three-party service data that is sent by the client terminal.

As in the example embodiment of the present disclosure, the key and the unique tag of the sensitive data received by the provider server are sent in the same request, the provider server may read the corresponding sensitive data according to the unique tag sent together with the key and decrypt the sensitive data. Therefore, the provider server may acquire the encrypted sensitive data and the key through different requests, and it is not necessary to require that the encrypted sensitive data and the key are received at the same time. Thus, even if others intercept the encrypted sensitive data, it is difficult to intercept the key carried in another request, and the encrypted sensitive data cannot be decrypted; so, the method according to the embodiment of the present disclosure can protect security of the sensitive data.

Corresponding to the method for protecting sensitive data that is applied to a provider server, an example embodiment of the present disclosure further provides an apparatus for protecting sensitive data that is configured at a provider server.

Figure 7:
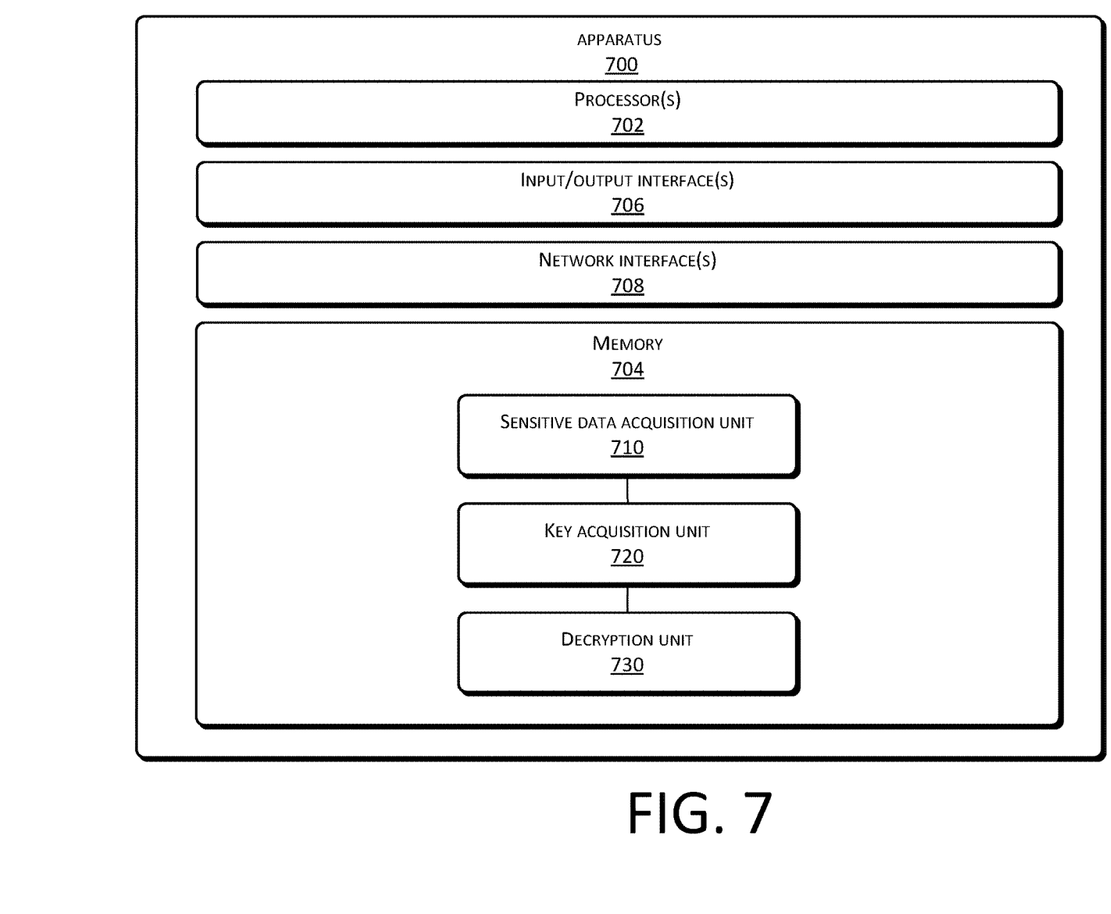
FIG. 7 is a schematic structural diagram of an example apparatus for protecting the security of sensitive data that is configured at a provider server according to an example embodiment of the present disclosure.

For example, referring to FIG. 7, it is a schematic structural diagram of an apparatus 700 for protecting sensitive data that is configured at a provider server according to an example embodiment of the present disclosure. As shown in FIG. 7, the apparatus 700 may include one or more processor(s) 702 or data processing unit(s) and memory 704. The apparatus 700 may further include one or more input/output interface(s) 706, and network interface(s) 708. The memory 704 is an example of computer-readable media.

The memory 704 may store therein a plurality of modules or units including:

a sensitive data acquisition unit 710 that acquires encrypted sensitive data sent by a client terminal through a first request, wherein the encrypted sensitive data is obtained by the client terminal through encryption by using a key in response to receipt of the sensitive data;

a key acquisition unit 720 that acquires a unique tag and a key sent by the client terminal through a second request, wherein the unique tag is a unique tag of the sensitive data, and the first request and the second request are different requests; and a decryption unit 730 that decrypts the sensitive data corresponding to the unique tag by using the key.

As the key and the unique tag of the sensitive data acquired by the key acquisition unit 720 in the apparatus 700 are sent in the same request, the decryption unit 730 may read the corresponding sensitive data according to the unique tag sent together with the key and decrypt the sensitive data. Therefore, the sensitive data acquisition unit 710 and the key acquisition unit 720 may acquire the encrypted sensitive data and the key respectively through different requests, and it is not necessary to require that the encrypted sensitive data and the key are acquired in the same request. Thus, even if others intercept the encrypted sensitive data, it is difficult to intercept the key carried in another request, and the encrypted sensitive data cannot be decrypted. The method according to the example embodiment of the present disclosure protects security of the sensitive data.

Figure 8:
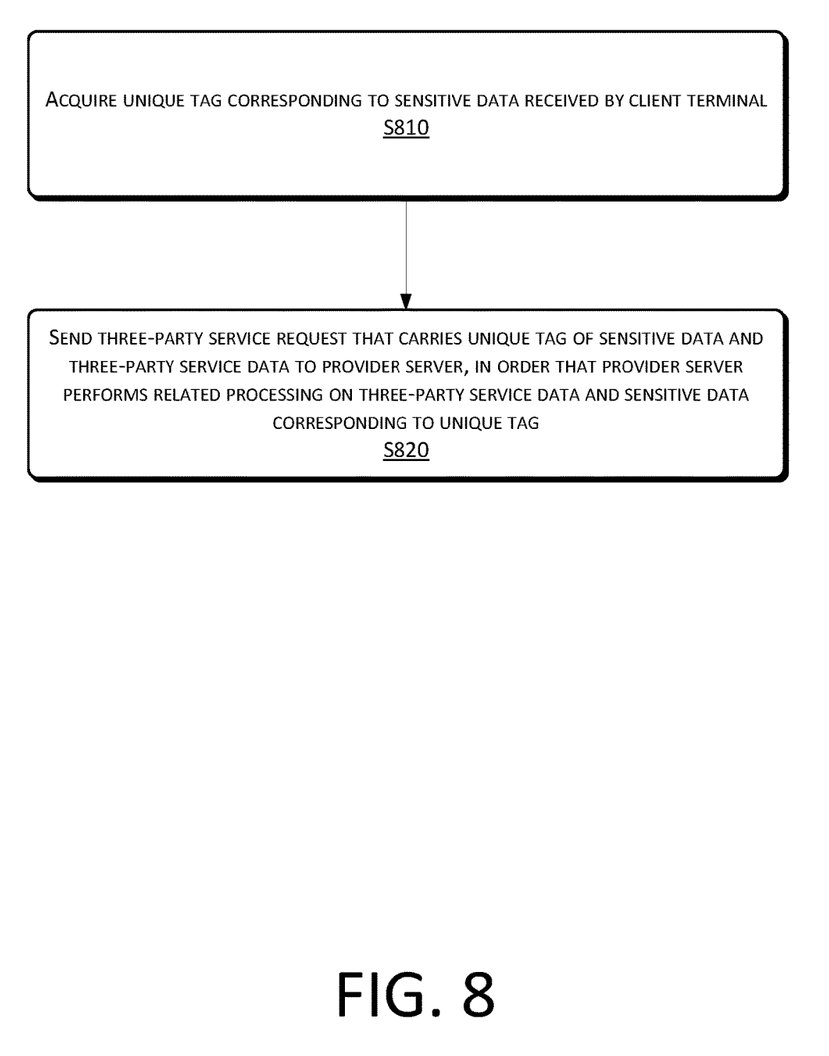
FIG. 8 is a flow chart of an example method for protecting the security of sensitive data that is applied to a third party server according to an example embodiment of the present disclosure.

In another aspect, an example embodiment of the present disclosure further provides an example method for protecting security of sensitive data that is applied to a third party server. For example, referring to FIG. 8, FIG. 8 is a schematic flow chart of an example method for protecting security of sensitive data that is applied to a third party server according to an embodiment of the present disclosure. As shown in FIG. 8, the method may include:

At S810, a unique tag corresponding to sensitive data received by a client terminal is acquired.

For example, a request that includes three-party service data sent by the client terminal may carry a unique tag corresponding to the sensitive data, and then the unique tag of the sensitive data is obtained from the request. For another example, when the client terminal receives the sensitive data, the third party server may generate a unique tag for the sensitive data, and then the unique tag is obtained.

At S820, a three-party service request that carries the unique tag of the sensitive data and three-party service data is sent to a provider server, in order that the provider server performs related processing on the three-party service data and the sensitive data corresponding to the unique tag. The sensitive data is encrypted by the client terminal by using a key and then sent to the provider server through a first request; the key and the unique tag are sent to the provider server by the client terminal through a second request, in order that the provider server decrypts the sensitive data corresponding to the unique tag by using the key, wherein the first request and the second request are different requests.

For example, in some example implementations, with reference to the schematic diagram of signaling interaction shown in FIG. 4, the third party server may receive a second request that carries the three-party service data, the key and the unique tag sent by the client terminal. The unique tag, the key and the three-party service data are obtained from the second request. Moreover, the third party server may also carry the key in the three-party service request, and send the key together to the provider server through the three-party service request.

For another example, in some other example implementations, with reference to the schematic diagram of signaling interaction shown in FIG. 3, the third party server may receive a third request that carries the three-party service data and the unique tag sent by the client terminal, and obtain the three-party service data and the unique tag from the third request.

As in the example embodiment of the present disclosure, the third party server acquires a unique tag corresponding to the sensitive data received by the client terminal, the third party server may send the unique tag and the three-party service data to the provider server by carrying them in the same request, and it is not necessary to send the sensitive data and the three-party service data together, thereby avoiding leakage of the sensitive data at the third party server. Moreover, the sensitive data has a unique tag, therefore, the sensitive data and the key identified by the unique tag may be sent to the provider server through different requests. Even if others intercept the encrypted sensitive data, it is difficult to intercept the key carried in another request, and the encrypted sensitive data cannot be decrypted. The method according to the embodiment of the present disclosure can protect security of the sensitive data.

Corresponding to the method for protecting sensitive data that is applied to a third party server, an embodiment of the present disclosure also provides an apparatus for protecting sensitive data that is configured at a third party server.

Figure 9:
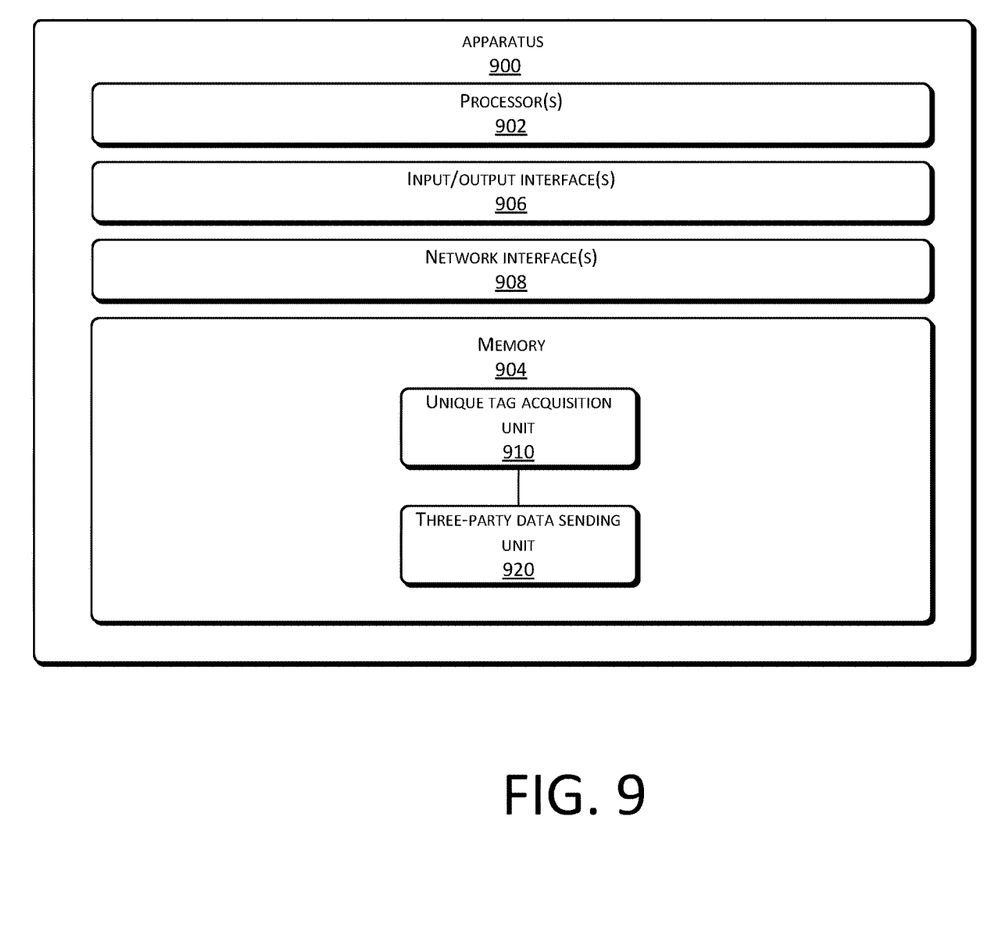
FIG. 9 is a schematic structural diagram of an example apparatus for protecting the security of sensitive data that is configured at a third party server according to an example embodiment of the present disclosure.

For example, referring to FIG. 9, it is a schematic structural diagram of an example apparatus 900 for protecting sensitive data that is configured at a third party server according to an example embodiment of the present disclosure. As shown in FIG. 9, the apparatus 900 may include one or more processor(s) 902 or data processing unit(s) and memory 904. The apparatus 900 may further include one or more input/output interface(s) 906, and network interface(s) 908. The memory 904 is an example of computer-readable media.

The memory 904 may store therein a plurality of modules or units including:
- a unique tag acquisition unit 910 that acquires a unique tag corresponding to sensitive data received by a client terminal; and
- a three-party data sending unit 920 that sends a three-party service request that carries the unique tag of the sensitive data and three-party service data to a provider server, in order that the provider server performs related processing on the three-party service data and the sensitive data corresponding to the unique tag. The sensitive data is encrypted by the client terminal by using a key and then sent to the provider server through a first request. The key and the unique tag are sent to the provider server by the client terminal through a second request, in order that the provider server decrypts the sensitive data corresponding to the unique tag by using the key. The first request and the second request are different requests.

As the unique tag acquisition unit 910 of the apparatus 900 acquires a unique tag corresponding to the sensitive data received by the client terminal, the three-party data sending unit 920 sends the unique tag and the three-party service data to the provider server by carrying them in the same request, and it is not necessary to send the sensitive data and the three-party service data together. Therefore, the sensitive data does not need to pass through the third party server, and leakage of the sensitive data at the third party server is avoided. Moreover, the sensitive data has a unique tag, therefore, the sensitive data and the key identified by the unique tag may be sent to the provider server through different requests. Even if others intercept the encrypted sensitive data, it is difficult to intercept the key carried in another request, and the encrypted sensitive data cannot be decrypted; so, the apparatus configured at a third party server according to the embodiment of the present disclosure can protect security of the sensitive data.

For the sake of convenient description, the above apparatus is divided into various units for various functions which are separately described. Certainly, when the present disclosure is implemented, the functions of various units may be implemented in one or more instances of software and/or hardware.

By the preceding description of the implementations, persons skilled in the art may clearly understand that the present disclosure may be implemented via software, hardware, or software plus the necessary general hardware platform. Based on such understanding, the substance of the technical solution of the present disclosure, or the portion of the present disclosure that makes contribution to the conventional techniques, may be embodied in the form of a computer software product that may be stored in a storage medium, such as ROM/RAM, diskette, compact discs, etc. and contains computer-executable instructions enabling a computer device (which may be a personal computer, a server, a network device, and so on) to execute the methods described in the embodiments or part of the embodiments of the present disclosure.

The example embodiments in this specification are all described in a progressive manner, and for identical or similar parts between different embodiments, reference may be made to each other so that each of the example embodiments focuses on differences from other example embodiments. Especially in terms of the system embodiment, it is basically similar to the method embodiment, therefore, the description thereof is relatively simple, and reference may be made to some descriptions in the method embodiment for the related contents.

The present disclosure may be used in an environment or in a configuration of universal or specialized computer systems. Examples include: a personal computer, a server computer, a handheld device or a portable device, a tablet device, a multi-processor system, a microprocessor-based system, a set-up box, a programmable consumer electronic device, a network PC, a small-scale computer, a large-scale computer, and a distributed computing environment including any system or device above. For example, the client terminal, the provider server, and the third party server may include one or more processors or processing units, memories, and computer-executable instruction stored on the memories to be executed by the processors to perform the above described acts or operations.

The present disclosure may be described in a general context of computer-executable instructions executed by a computer, such as a program module. Generally, the program module includes routines, programs, objects, components, data structures that execute particular tasks or implement particular abstract data types. The present disclosure may also be practiced in distributed computing environments, and in the distributed computing environments, tasks may be executed by remote processing devices connected via a communication network. In the distributed computing environments, the program module may be located in local and remote computer storage mediums that include storage devices.

It should be noted that relational terms herein, such as first and second, and the like are used solely to distinguish one entity or operation from another entity or operation without necessarily requiring or implying any actual such relationship or order between such entities or operations. Furthermore, the term "include," "comprise" or any other variants thereof are intended to cover non-exclusive inclusion, so that a process, a method, an article or a device including a series of elements not only includes these elements, but also includes other elements not explicitly listed, or further includes inherent elements of the process, the method, the article or the device. Under the condition of without further limitation, an element as defined by a statement "including a . . . " is not exclusive of additional identical elements in the process, the method, the article or the device of the element.

The above descriptions are only example embodiments of the present disclosure, and are not intended to limit the protection scope of the present disclosure. Any modification, equivalent replacement, improvement and the like made within the spirit and principle of the present disclosure should all be included in the protection scope of the present disclosure.

What is claimed is:

1. A method comprising:
    encrypting, by a client terminal, sensitive data by using a key in response to receipt of the sensitive data;
    sending, by the client terminal, the encrypted sensitive data to a provider server through a first request;
    obtaining, by the client terminal, a unique tag identifying the sensitive data from a third party server, the unique tag being further used for identifying the key;
    sending, by the client terminal, the key and the unique tag to the provider server through a second request; and
    sending three-party service data identified by the unique tag to the third party server so that the third party server generates a three-party service request that carries the unique tag and the three-party service data and sends the three-party service request to the provider server, wherein the client terminal, the provider server and the third party server are different from one another.

2. The method of claim 1, further comprising requesting the provider server to decrypt the sensitive data corresponding to the unique tag by using the key.

3. The method of claim 1, wherein the first request and the second request are different requests.

4. The method of claim 1, the unique tag includes a random code and a timestamp.

5. The method of claim 1, further comprising sending the key and the unique tag to the third party server so that the third party server obtains the unique tag and the key, and wherein the three-party service request further carries the unique tag and the key.

6. The method of claim 1, wherein the key is a dynamic key generated for the sensitive data.

7. A method comprising:
acquiring, by a provider server, encrypted sensitive data sent by a client terminal through a first request, the encrypted sensitive data being obtained by the client terminal through encryption by using a key;
acquiring, by the provider server, a unique tag and the key sent by the client terminal through a second request, the unique tag is a unique tag identifying the sensitive data and the first request and the second request being different requests;
storing, by the provider server, the encrypted sensitive data and the unique tag as a key-value pair;
decrypting, by the provider server, the sensitive data corresponding to the unique tag by using the key;
receiving a three-party service request sent from a third party server, the three-party service request carrying the unique tag and three-party service data; and
performing processing on the three-party service data and the sensitive data corresponding to the unique tag, wherein:
the three-party service request further carries the key; and
acquiring the unique tag and the key sent by the client terminal through the second request comprises acquiring the unique tag, the key and the three-party service data from the received three-party service request, the three-party service request being sent by the third party server in response to receipt of the second request carrying the unique tag, the key and the three-party service data that is sent by the client terminal.

8. The method of claim 7, further comprising:
generating a unique tag of the sensitive data; and
returning the unique tag back to the client terminal.

9. The method of claim 8, wherein the unique tag includes a random code and a timestamp.

10. The method of claim 7, further comprising:
receiving the unique tag that is sent together with the encrypted sensitive data, the unique tag being generated for the sensitive data by the client terminal after receiving the sensitive data.

11. The method of claim 7, further comprising:
receiving the unique tag that is sent together with the encrypted sensitive data, the unique tag being generated by a third party server for the sensitive data.

12. A method comprising:
acquiring, at a third party server, a unique tag identifying sensitive data received by a client terminal; and
sending, by the third party server, a three-party service request that carries the unique tag and three-party service data to a provider server, to cause the provider server to process the three-party service data and the sensitive data, the unique tag being further used for identifying the three-party service data, wherein:
the sensitive data does not pass through the third party server to avoid a leakage of the sensitive data at the third party server,
the sensitive data is encrypted by the client terminal by using a key and sent to the provider server through a first request;
the key and the unique tag are sent to the provider server by the client terminal through a second request; and
the first request and the second request are different requests.

13. The method of claim 12, wherein the provider server decrypts the sensitive data corresponding to the unique tag by using the key.

14. The method of claim 12, wherein the third party server, the client terminal and the provider server are different from one another.

* * * * *